(12) United States Patent
    Powers

(10) Patent No.: US 9,374,981 B2
(45) Date of Patent: Jun. 28, 2016

(54) AUTOMATED ANIMAL FEEDING APPARATUS

(71) Applicant: Kenneth Jay Powers, Encinitas, CA (US)

(72) Inventor: Kenneth Jay Powers, Encinitas, CA (US)

(*) Notice: Subject to any disclaimer, the term of this patent is extended or adjusted under 35 U.S.C. 154(b) by 0 days.

(21) Appl. No.: 14/415,715

(22) PCT Filed: Mar. 6, 2013

(86) PCT No.: PCT/US2013/029224
§ 371 (c)(1),
(2) Date: Jan. 19, 2015

(87) PCT Pub. No.: WO2014/018101
PCT Pub. Date: Jan. 30, 2014

(65) Prior Publication Data
US 2015/0164044 A1    Jun. 18, 2015

Related U.S. Application Data

(60) Provisional application No. 61/676,304, filed on Jul. 26, 2012.

(51) Int. Cl.
*A01K 5/01*    (2006.01)
*A01K 5/02*    (2006.01)
*A01K 5/00*    (2006.01)

(52) U.S. Cl.
CPC ............ *A01K 5/0225* (2013.01); *A01K 5/00* (2013.01); *A01K 5/0114* (2013.01); *A01K 5/0142* (2013.01); *A01K 5/0241* (2013.01); *A01K 5/0275* (2013.01); *A01K 5/0291* (2013.01)

(58) Field of Classification Search
CPC ....... A01K 5/00; A01K 5/001; A01K 5/0114; A01K 5/0142; A01K 5/02; A01K 5/0225; A01K 5/0241
See application file for complete search history.

(56) References Cited

U.S. PATENT DOCUMENTS 4,315,483 A * 2/1982 Scheidler ............. A01K 5/0291
                                                           119/51.11
4,522,152 A * 6/1985 Meyer ................... A01K 5/0275
                                                            119/56.1

(Continued)

FOREIGN PATENT DOCUMENTS

JP    2001314133 A    11/2001
WO    9510180 A    4/1995

OTHER PUBLICATIONS

International Preliminary Report on Patentability issued on: Jan. 27, 2015 in International Application No. PCT/US2013/029224 filed on Mar. 6, 2013 and published as: WO/2014/018101 on: Jan. 30, 2014.

(Continued)

*Primary Examiner* — Monica Williams
*Assistant Examiner* — Michael A Fabula
(74) *Attorney, Agent, or Firm* — Procopio Cory Hargreaves and Savitch LLP

(57) ABSTRACT

An animal feeder is configured to resist clogging, enable user cleaning of the feed dispensing canister assembly and resist pest intrusion. The animal feeder includes an outer shell assembly detachably connected to a dispensing canister assembly configured to push the feed over the top of the dispensing canister assembly into the outer shell assembly. The expelled feed is collected into a feed passage and delivered to a feed receptacle.

15 Claims, 10 Drawing Sheets

(56) References Cited

U.S. PATENT DOCUMENTS

| | | | | |
|---|---|---|---|---|
| 4,802,302 | A * | 2/1989 | Alnafissa | A01K 5/0142 119/61.53 |
| 5,109,800 | A * | 5/1992 | Williams | A01K 5/0142 119/61.53 |
| 5,363,805 | A * | 11/1994 | Wing | A01K 5/0291 119/51.11 |
| 5,619,952 | A * | 4/1997 | Walker | A01K 5/0142 119/61.53 |
| 5,794,560 | A | 8/1998 | Terenzi | |
| 2006/0185606 | A1 * | 8/2006 | Park | A01K 5/0291 119/51.12 |
| 2006/0191486 | A1 | 8/2006 | Mishler | |
| 2007/0193524 | A1 | 8/2007 | Turner et al. | |
| 2009/0145365 | A1 * | 6/2009 | Mahle | A01K 5/0114 119/51.01 |
| 2009/0205573 | A1 * | 8/2009 | Briere | A01K 5/0291 119/57.91 |
| 2012/0042831 | A1 | 2/2012 | Holloway et al. | |

OTHER PUBLICATIONS

International Search Report mailed on: Jul. 1, 2013 in International Application No. PCT/US2013/029224 filed on Mar. 6, 2013 and published as: WO/2014/018101 on: Jan. 30, 2014.

* cited by examiner

AUTOMATED ANIMAL FEEDING APPARATUS

CROSS REFERENCE TO RELATED APPLICATIONS

This application claims the benefit of priority to U.S. Provisional Patent Application Ser. No. 61/676,304, filed Jul. 26, 2012 and entitled "Automated Animal Feeding Apparatus"; the entirety of which is incorporated by reference

FIELD OF THE INVENTION

The disclosure relates generally to an animal feeder that resists clogging by the feed and related uses. The feeder can be automatically controlled. The animal feeder has a hopper assembly that can be readily removed from the feeder housing and associated electronics for cleaning. The hopper assembly is configured to resist pest access.

BACKGROUND OF THE INVENTION

Numerous conventional livestock feeders, deer feeders, bird feeders, and pet feed dispensers are known to those of ordinary skill in the art. Most of these devices operate by gravity or in a rotary manner, and dispense, either on-demand or in a timed manner, bulk feed items, pellets, or seeds to animals in proximity to the devices.

For example, U.S. Patent Application Publication No. 2006/0191486 to Mishler discloses a feeder that dispenses bulk feed items from multiple bins using, in one case, a single, moving solenoid release mechanism. This device, however, operates by gravity. U.S. Patent Application Publication No. 2009/0145365 to Mahle et al. discloses a pet pantry that includes a feed dispensing mechanism that operates manually through the use of a vertically-oriented, linearly-actuated spring mechanism that does not isolate the feed from pests.

Prior disclosed apparatuses are subject to clogging/jamming by the animal feed. None of the prior art disclosures describe an animal feeder that suitably isolates the feed from pests. Nor do the prior art disclosures describe an animal feeder wherein the feed-contacting parts can be readily removed by the operator for cleaning.

SUMMARY OF THE INVENTION

The present invention provides an animal feeder having (a) a top assembly with a motor; (b) an outer shell assembly comprising a bounce plate and feed tube; and (c) a hopper assembly including a hopper assembly shell configured to contain feed, a pusher plate coupled to a screw extending the length of the hopper assembly shell that vertically drives the plate structure within the feed hopper and wherein the screw is operably connected to the motor, wherein the outer shell assembly is detachably connected to the hopper assembly. In some embodiments the hopper assembly is cylindrical. In some embodiments, the animal feeder also has an electronic control mechanism. In some embodiments, the bounce plate is in at least two parts. In some embodiments, the animal feeder also has a feed receptacle assembly. In some embodiments, the animal feeder also has a paddle that broadcasts the feed from the top over the sides of the hopper assembly. In some embodiments, the hopper assembly also has a holder assembly with arms and the outer shell assembly includes receiving ends for the arms. In some embodiments, the arms and/or receiving ends include a pest barrier.

The present invention also provides an animal feeder having (a) an outer shell assembly including a bounce plate and feed tube; and (b) a hopper assembly including a hopper assembly shell configured to contain feed, a pusher plate coupled to a screw extending the length of the hopper assembly shell that vertically drives the plate structure within the feed hopper, wherein the outer shell assembly is detachably connected to the hopper assembly. In some embodiments the hopper assembly is cylindrical. In some embodiments, the animal feeder also has an electronic control mechanism. In some embodiments, the bounce plate is in at least two parts. In some embodiments, the animal feeder also has a feed receptacle assembly. In some embodiments, the animal feeder also has a paddle that broadcasts the feed from the top over the sides of the hopper assembly. In some embodiments, the animal feeder includes a motor operably connected to the screw. In some embodiments, the animal feeder includes a top assembly. In some embodiments, the hopper assembly also has a holder assembly with arms and the outer shell assembly includes receiving ends for the arms. In some embodiments, the arms and/or receiving ends include a pest barrier, The present invention also provides an animal feeder having (a) a top assembly including a motor, a motor coupler and an electronic control mechanism, (b) an outer shell assembly including receiving ends for a hopper assembly, a bounce plate having at least two parts, a feed tube and a feed receptacle assembly; and (c) the hopper assembly including a hopper assembly shell configured to contain feed, a holder assembly with arms, a pusher plate coupled to a screw extending the length of the hopper assembly shell that vertically drives the plate structure within the feed hopper and wherein the screw is operably connected to the motor, and a paddle that broadcasts the feed from the top over the sides of the hopper assembly. The electronic control mechanism can further implement software to provide functions such as automated scheduled feeding, camera operation, and internet or telephony communication.

The present invention also provides methods using all embodiments of the animal feeder described above for providing feed to an animal by adding the feed to the animal feeder and directing the animal feeder to dispense the feed.

The present invention also provides methods of cleaning all embodiments of the animal feeder described above by removing one of the components from animal feeder, cleaning the component, and optionally returning the cleaned component to the animal feeder. The component can be, for example, the hopper assembly, the bounce plate, or the feed tube.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

In various exemplary embodiments, the present invention provides generally an animal feeding apparatus and related methods. Provided herein is an animal feeder configured to resist clogging by the feed, enables user cleaning of the feed hopper assembly and resist pest intrusion. In an embodiment, the animal feeder includes an outer shell assembly detachably connected to a hopper assembly configured to push the feed over the top of the hopper assembly into the outer shell assembly. The expelled feed is collected into a feed tube and delivered to a feed receptacle. The feed can be dry food or kibble.

Figure 1:
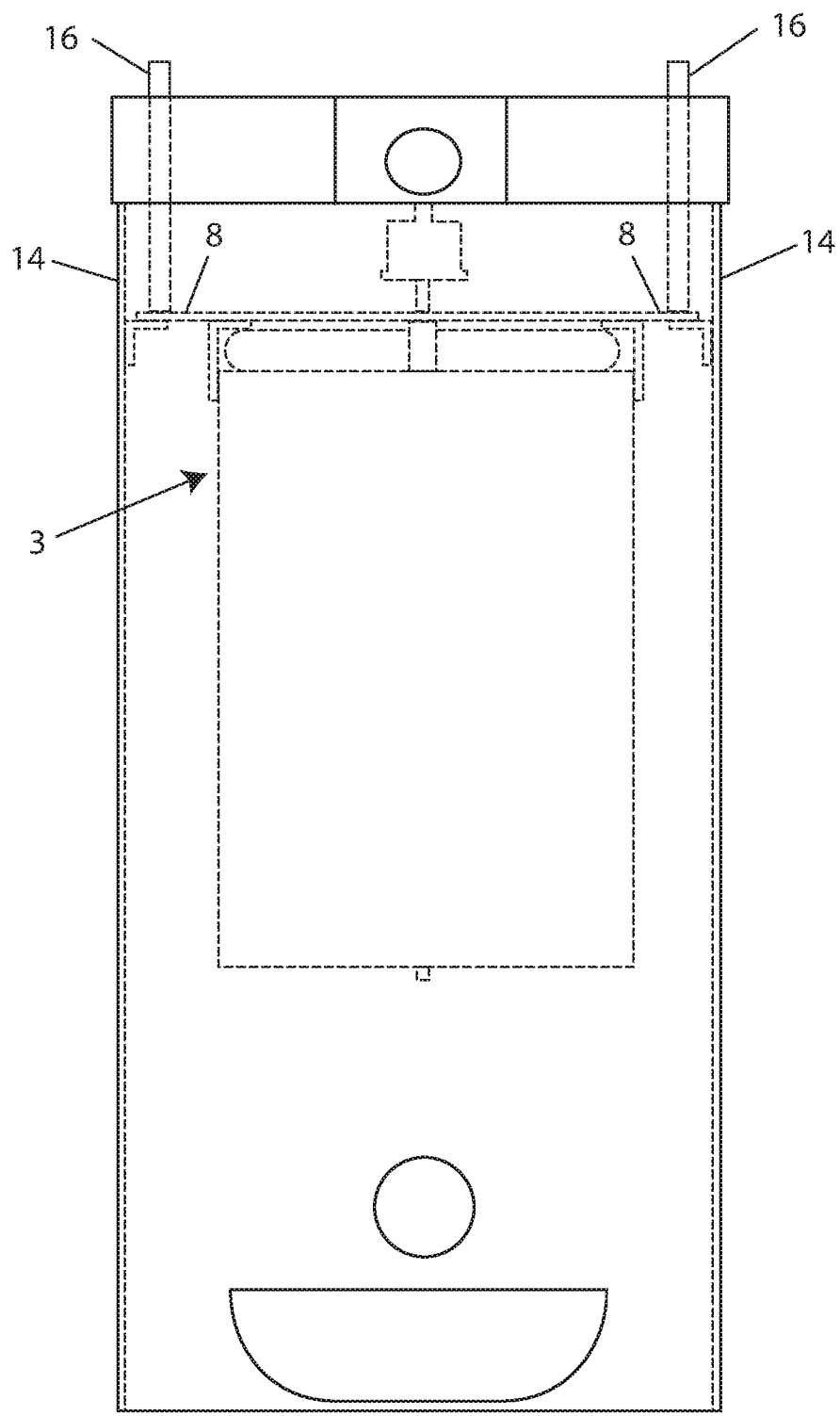
FIG. 1 is a frontal view illustrating one exemplary embodiment of the feeder apparatus of the present invention.

FIG. 1 shows a front view of an exemplary embodiment of the apparatus with a feed dish.

Figure 2:
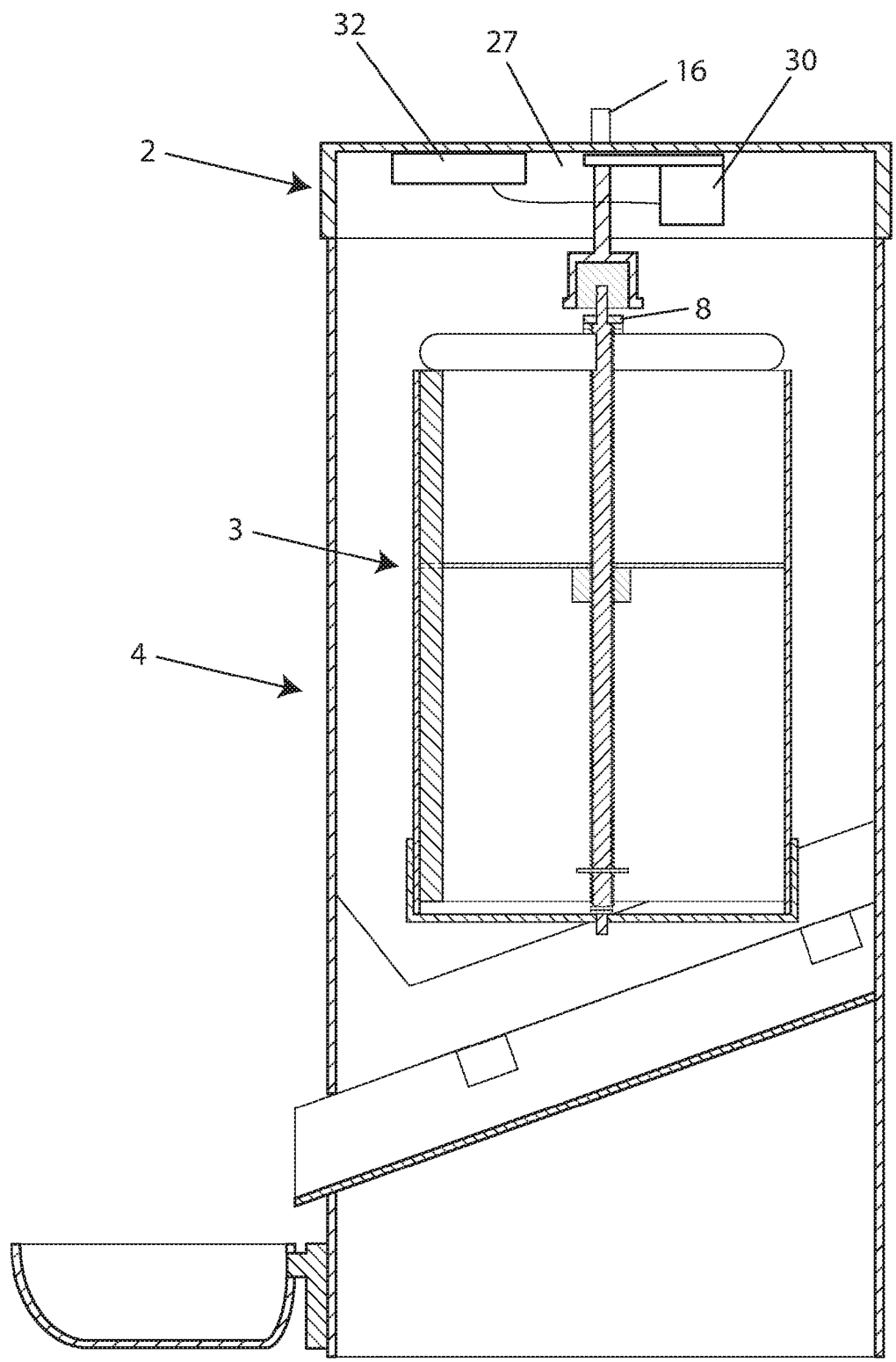
FIG. 2 is a cutaway side view illustrating one exemplary embodiment of the feeder system of the present invention.

Referring to FIG. 2, in one exemplary embodiment of the present invention, the animal feeder apparatus 1 comprises a top assembly 2, a feed dispensing canister assembly or hopper assembly 3, and an outer shell assembly 4. The component parts can be made of any suitable materials that resist contamination and rust, including stainless steel, ceramics, carbon fiber composite and plastics. Suitable plastics include ABS, polypropylene, polyethylene, polycarbonate, polyimide, polyamide, melamine resins, cyclic polyolefins, composites or reinforced plastics such as fiberglass, and other thermoplastics known in the art.

Figure 3:
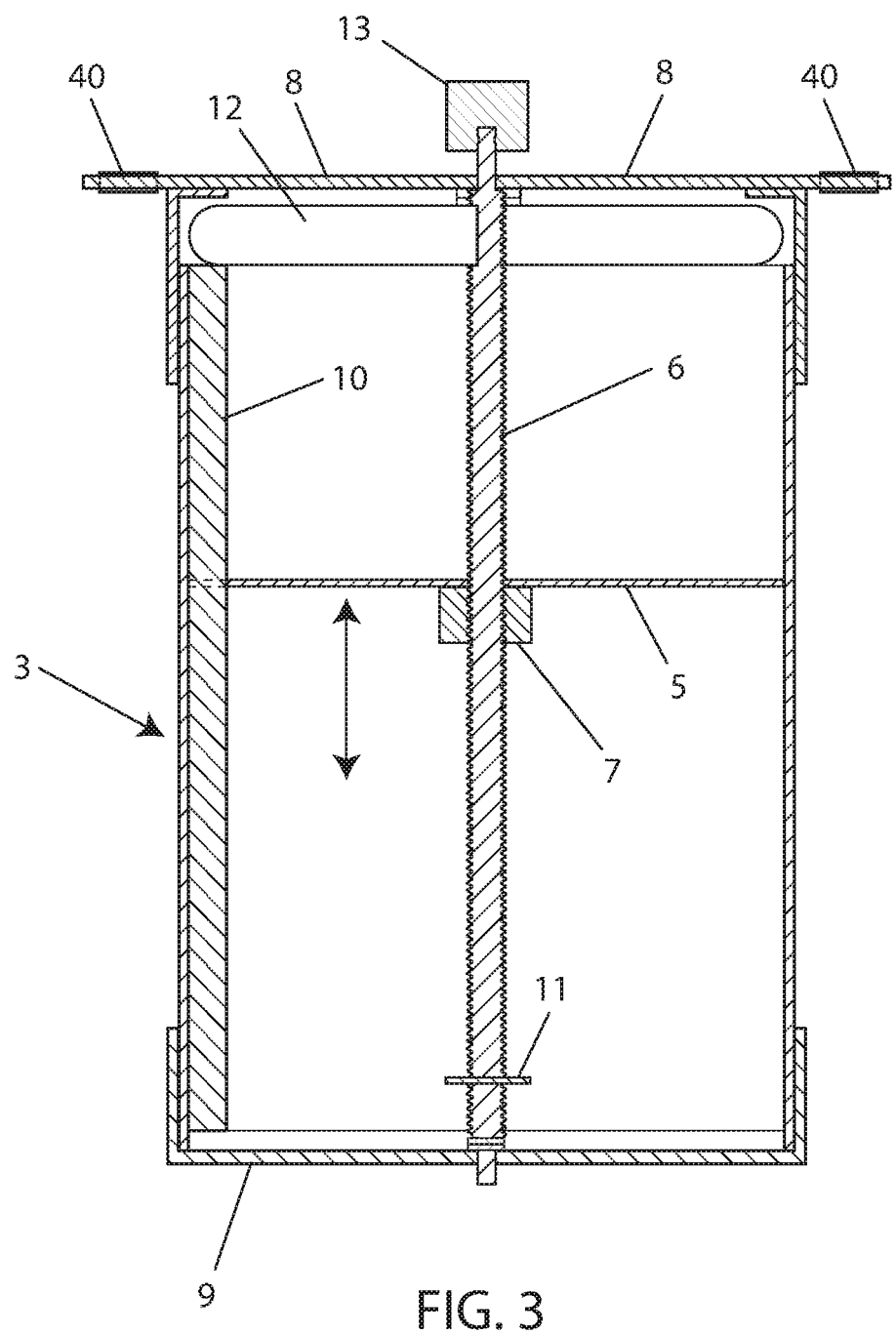
FIG. 3 is a cutaway side view illustrating one exemplary embodiment of the hopper assembly of the feeder apparatus.

FIG. 3 shows a cutaway side view of the hopper assembly 3 in an embodiment of the present invention. An open-top feed dispensing canister assembly shell 33 is a canister that retains the feed within the hopper assembly 3 until the feed is dispensed. Within the hopper assembly shell 33 is a pusher plate 5 attached to a nut 7 and disposed to retain the feed (feed in the hopper assembly 3 is inhibited from passing under the pusher plate) threaded on a screw 6, where the pusher plate is raised or lowered via a nut 7 or other suitable fastener below the pusher plate 5 driven by rotation of the screw 6. The screw 6 is held in place by a top holder assembly 8 and a bottom holder assembly 9. The top holder assembly 8 has hanger arms or other suitable connectors that allow the user to detach the hopper assembly 3 from the outer shell assembly 4. The rotation stop 10 prevents rotational movement of the pusher plate 5, which prevents the nut 7 from rotating when the screw 6 turns. A pin 11 is disposed near the bottom end of the screw underneath the hopper assembly shell 33 to limit the downward displacement of the nut 7. As feed is pushed up by the rotation of the screw 6 driving up the pusher plate 5 via the nut 7, the upwardly displaced feed comes into contact with a paddle 12 which broadcasts the feed from the top over the hopper assembly shell 33 of the hopper assembly 3. At the top end of the screw 6, is connected a coupler assembly 13. The coupler assembly 13 can be attached to the drive of a motor or a hand crank or other suitable rotational force-generating mechanism. While the hopper assembly shell 33 is shown as a cylinder, it is appreciated by those in the art that other suitable shapes can be substituted, e.g. elliptical cylinder or rectangular (polyhedral). One skilled in the art realizes that a rotation stop 10 is not necessary for some of these other hopper assembly shell 4 configurations. While the exemplary embodiment shows the top holder assembly 8 with hanger arms or other suitable connectors that allow the user to detach the hopper assembly 3 from the outer shell assembly 4, it is appreciated by those in the art that the hanger arms can be disposed on the bottom holder assembly 9 or both. Furthermore, it is appreciated by those in the art that any number of connectors between the hopper assembly 3 and the outer shell assembly 4 can be used, as long as the a hopper assembly 3 is suitably stabilized within the outer shell assembly 4. Additionally, the connectors can include a pest barrier 40 to prevent pests from entering the hopper assembly 3. Pest barriers can include, for example, pest tape such as FITO brand ANT STOPPA® TAPE double-sided tape (Spotless Punch Ltd., Redhill, UK). Pests can include ants, cockroaches, rodents and the like.

Figure 4:
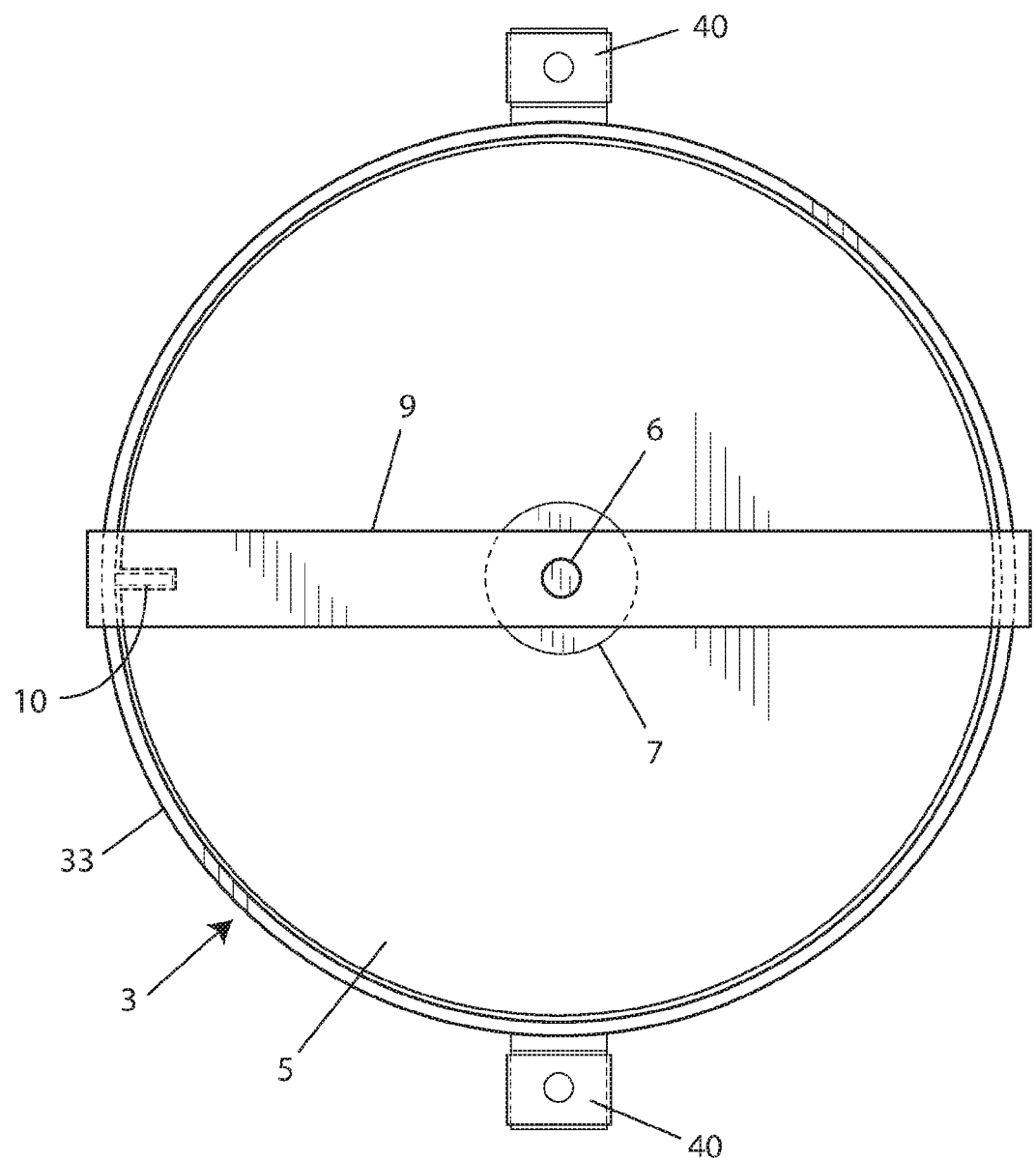
FIG. 4 is a bottom view illustrating one exemplary embodiment of the hopper assembly of the feeder apparatus.

Moving to FIG. 4, the bottom of the hopper assembly 3 in an embodiment of the present invention is shown.

Figure 5:
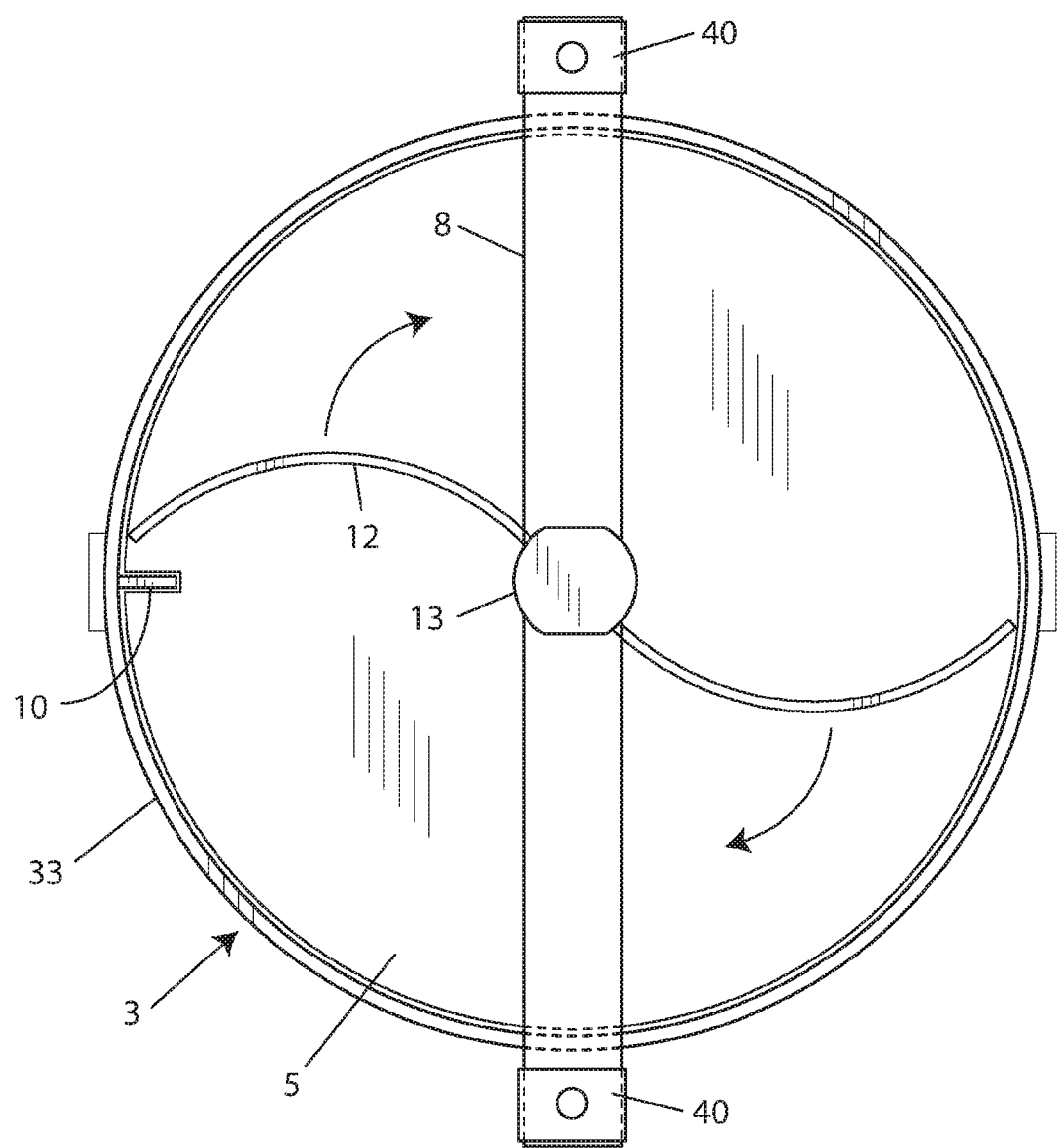
FIG. 5 is a top view illustrating one exemplary embodiment of the hopper assembly of the feeder apparatus.

Moving to FIG. 5, the top of the hopper assembly 3 in an embodiment of the present invention is shown.

Figure 6:
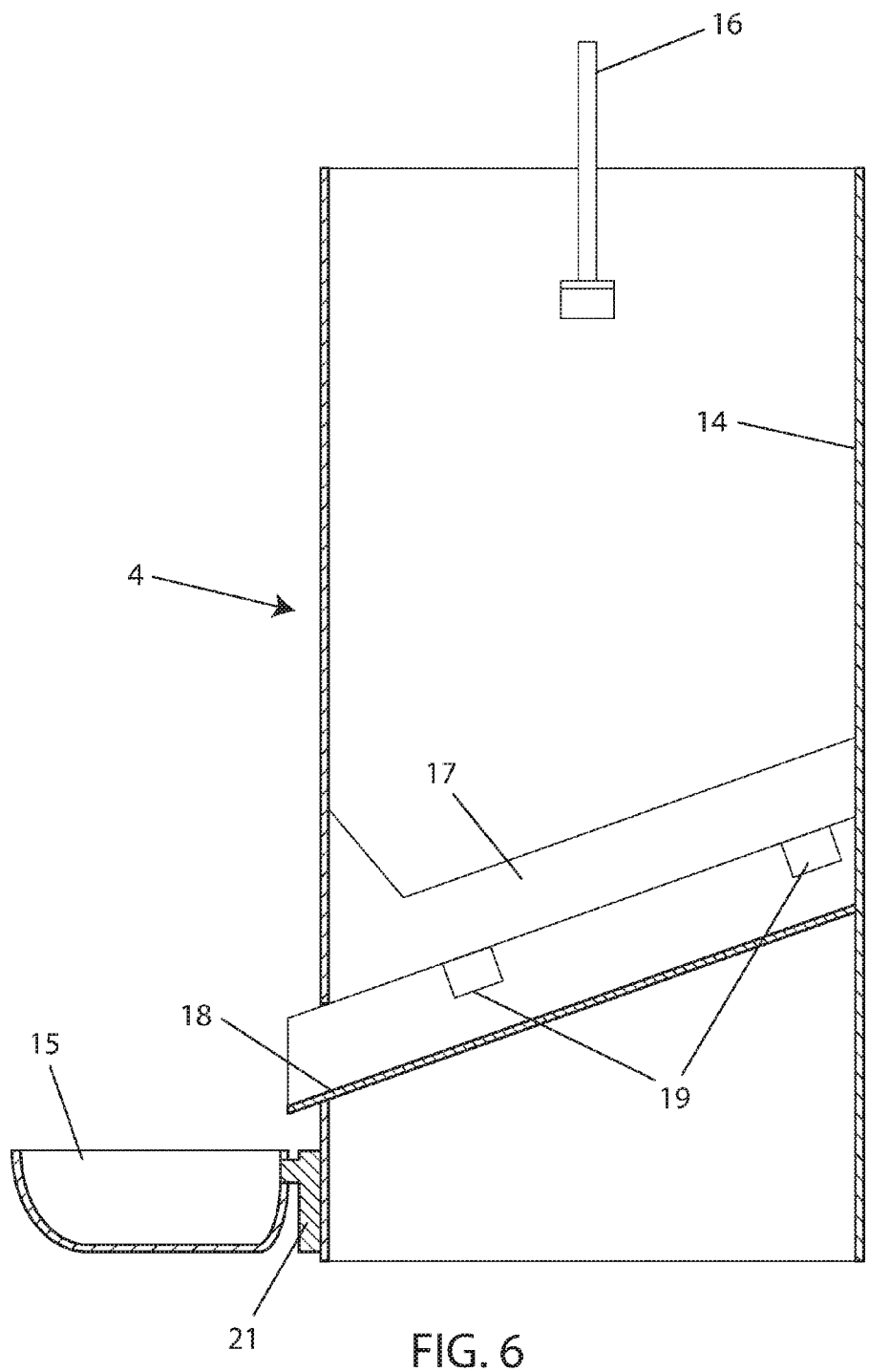
FIG. 6 is a side cutaway view illustrating one exemplary embodiment of the outer shell assembly of the feeder apparatus.

FIG. 6 shows a cutaway side view of the outer shell assembly 4 in an embodiment of the present invention. The outer assembly shell 14 is a canister that contains the hopper assembly 3 and directs the feed pushed out from the hopper assembly 3 to a feed receptacle 15 or other suitable feed receptacle that is elevated slightly above a supporting floor surface. The guide pins 16 are disposed on the outer assembly shell 14 to receive the hanger arms or other suitable connectors of the top holder assembly 8 (FIG. 5) of the hopper assembly 3. A bounce plate 17, which is disposed within the outer shell assembly 4 below the hopper assembly 3 when the hopper assembly 3 is installed into the outer shell assembly 4, directs the feed that drops from the hopper assembly 3 to an opening to the feed tube 18. The bounce plate 17 can be angled such that the feed is unlikely to be retained on the bounce plate 17 and instead travel into the feed tube 18 opening. The feed tube 18 can be angled such that the feed is dispensed without interruption to the feed receptacle 15. The bounce plate 17 can be held in place relative to the feed tube 18 by bounce plate holders 19. Optionally, the outer shell assembly 4 can have a feed receptacle assembly 21 to prevent the feed receptacle 15 from moving due to the force of feed dispensing or the users or animals displacing the feed receptacle and causing the dispensed feed to spill on the floor. While shown as separate parts, it is appreciated by those in the art that the feed tube 18 and bounce plate 17 can be of unitary construction.

Figure 7:
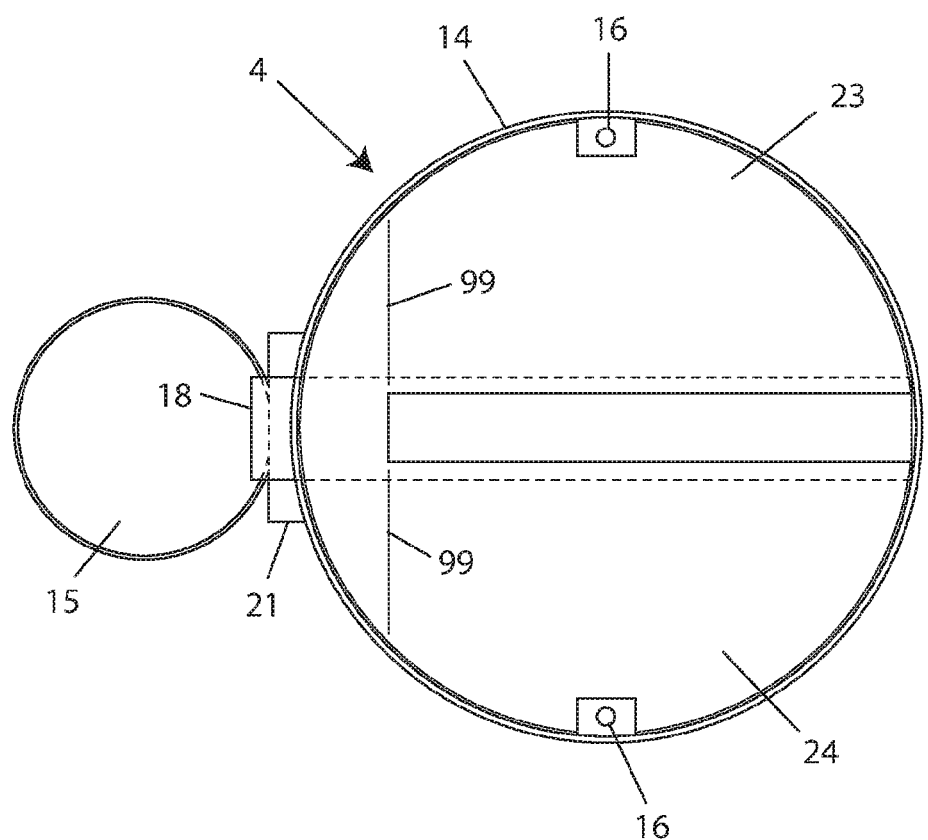
FIG. 7 is a top view illustrating one exemplary embodiment of the outer shell assembly of the feeder apparatus.

Moving to FIG. 7, the top of the outer shell assembly 4 in an embodiment of the present invention is shown. As shown in the embodiment herein, the bounce plate 17 (see FIG. 6) can be made of two or more components. In the drawing is shown a right bounce plate 23 and a left bounce plate 24. Where the bounce plate is comprised of more than one part, the user can more easily remove the bounce plate 17 for cleaning. As shown in the embodiment herein, the bounce plate(s) can further include a bend 99 to further prevent feed from being retained on the bounce plate(s). Furthermore, it is appreciated by those in the art that other configurations of bounce plate(s) (e.g. a funnel configuration) can be used to direct feed to the feed tube.

Figure 8:
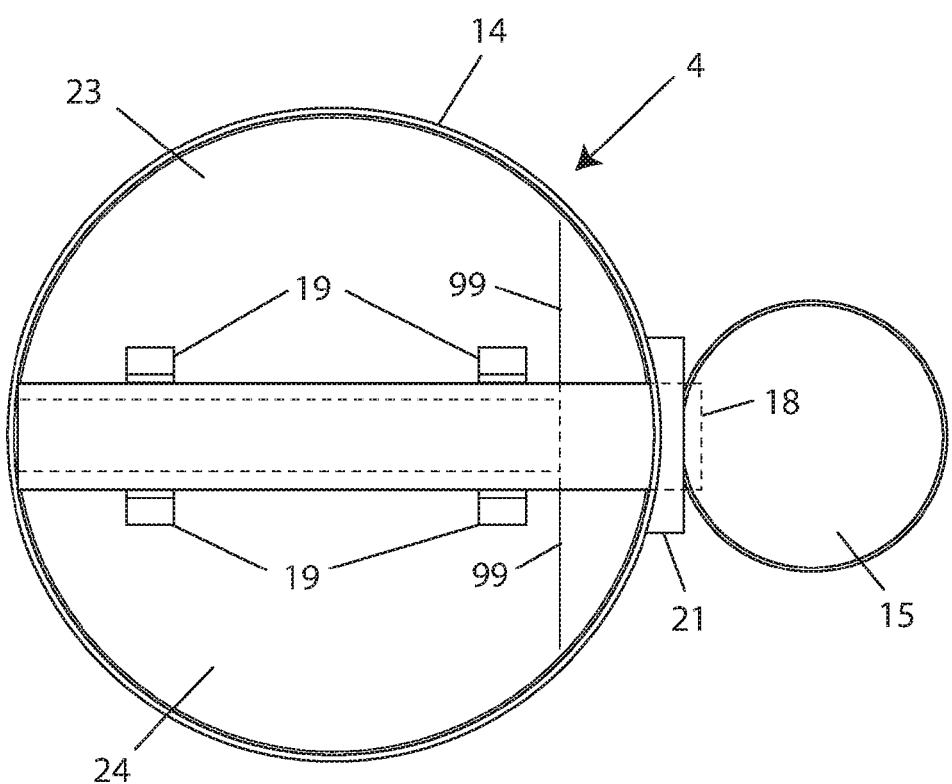
FIG. 8 is a bottom view illustrating one exemplary embodiment of the outer shell assembly of the feeder apparatus.

Moving to FIG. 8, the bottom of the outer shell assembly 4 in an embodiment of the present invention is shown.

Figure 9:
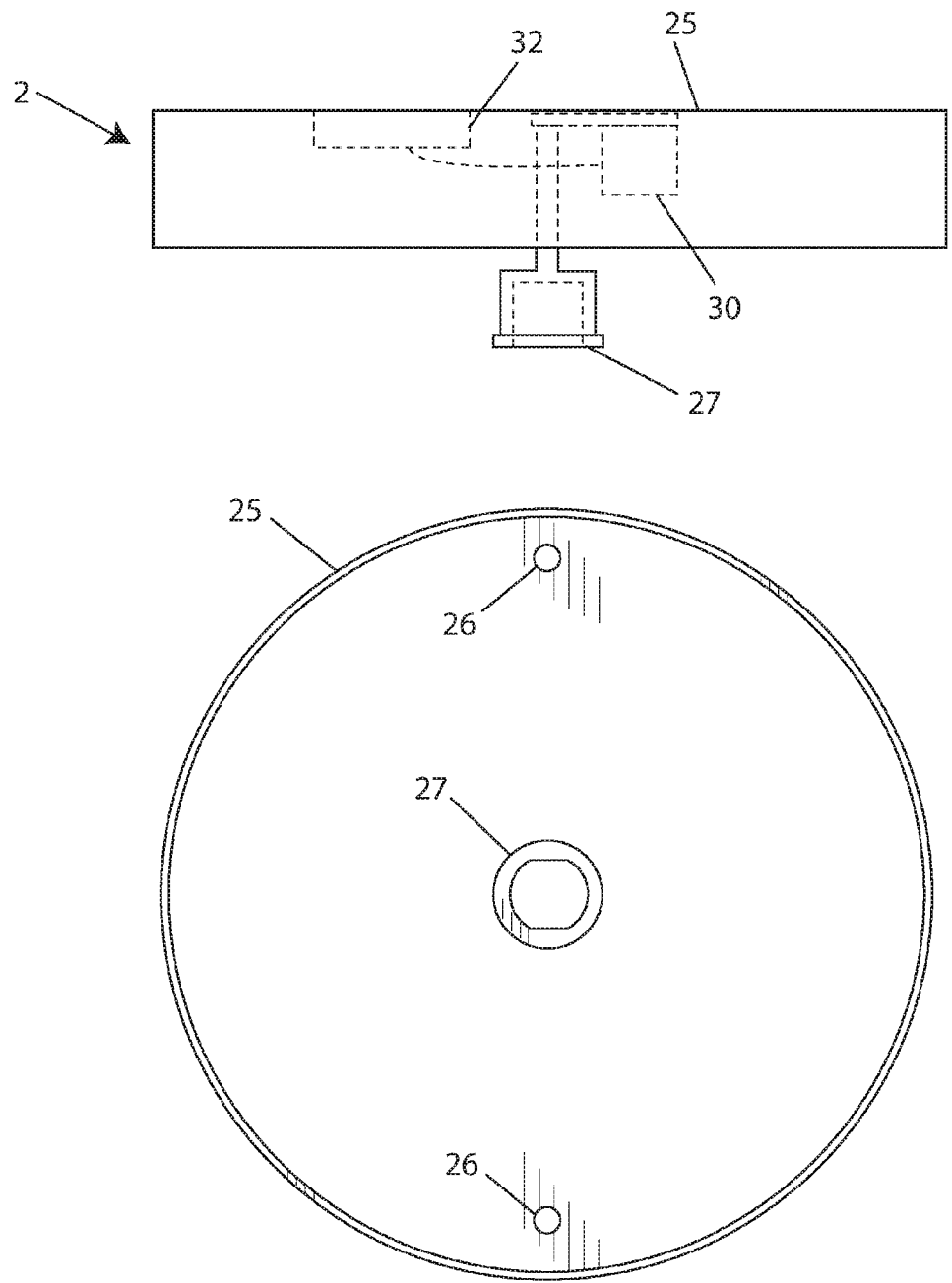
FIG. 9 is a side view illustrating one exemplary embodiment of the top assembly of the feeder apparatus and a bottom view illustrating one exemplary embodiment of the top assembly of the feeder apparatus; and, FIG. 10 is a top view illustrating one exemplary embodiment of the top assembly of the feeder apparatus.
Figure 10:
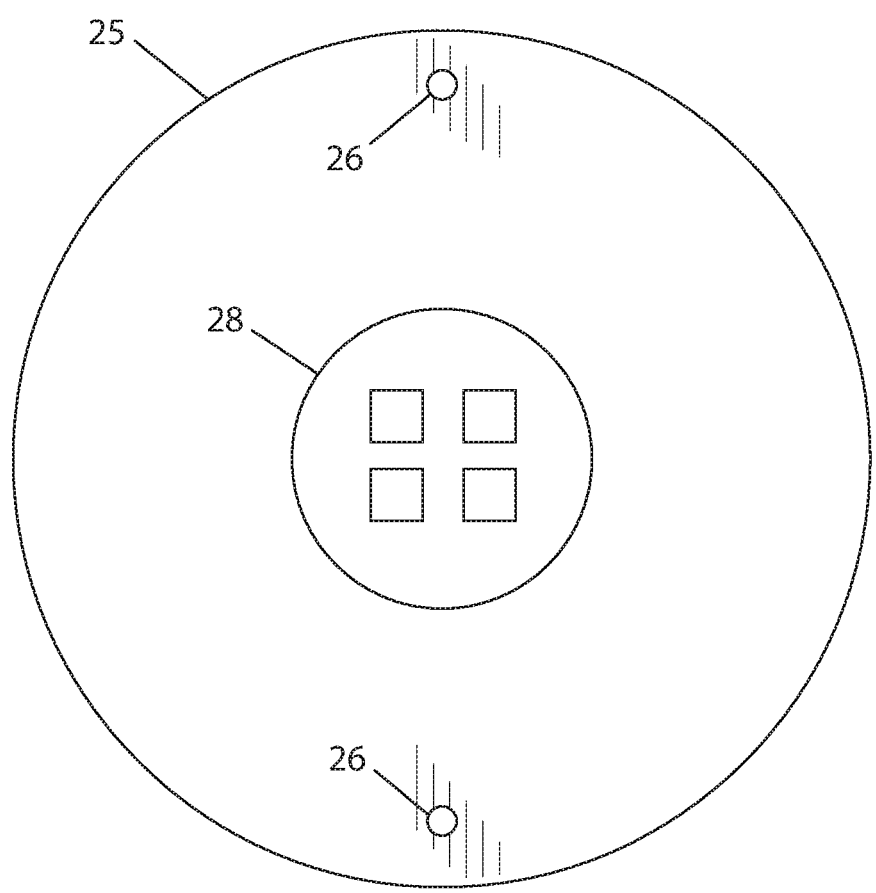

FIG. 9 shows side and bottom views of the top assembly 2. The top assembly 2 includes a top housing 25 that can contain the electronics and a rotational force-generating mechanism (e.g., motor) 30. The top assembly 2 includes guide pin holes 26 to align the top assembly 2 with the outer shell assembly 4. The top assembly 2 also includes an upper motor coupler 27 to operably connect a motor to the coupler assembly 13 to drive the screw 6. It is appreciated by those in the art that the upper motor couple could be attached to a hand crank rather than a motor to drive the screw. FIG. 10 shows a top view of the top assembly 2. The top assembly 2 includes a keypad assembly 28 or other electronic control interface to, for example dispense feed, monitor feed level and alert the user when feed is low. While the exemplary embodiment shows the top assembly 2 with guide pin holes 26 to align the top assembly 2 with the outer shell assembly 4, it is appreciated by those in the art that other connectors are suitable for aligning the assemblies. The pins 16 prevent rotation of the top 2 caused by motor torque imparted to the screw 6. While the embodiment shown includes a motor 30 and electronic control 32 in the top assembly, it is appreciated by those in the art that other placements of the motor as well as of the control electronics are possible.

Provided herein are methods for feeding animals using the apparatus of the invention. These include methods using all embodiments of the animal feeder described above for providing feed to an animal by adding the feed to the animal feeder and directing the animal feeder to dispense the feed.

The electronic control mechanism can further implement software to provide functions such as automated scheduled feeding, camera operation, and internet or telephony communication. The electronic control can include software that schedules activation of the animal feeder for any number of times per day, days per week, etc. The apparatus can include a camera to allow interaction of the user with the animal via the internet, including the mobile web. The electronic control can provide alerts to the user, such as notifications for apparatus malfunction or low feed level.

The hopper assembly 3 can be removed from the outer shell assembly 4 by the user and washed. The bounce plate 17 (or left and right bounce plates, 23 and 24, respectively) and feed tube 18 may also be removed by the user for cleaning.

The present invention also provides methods of cleaning all embodiments of the animal feeder described above by removing one of the components from animal feeder, cleaning the component, and optionally returning the cleaned component to the animal feeder. The component can be, for example, the hopper assembly, the bounce plate, or the feed tube.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

I claim:

1. An animal feeder comprising,
   a) a rotational force-generating mechanism;
   b) an outer shell assembly carrying the rotational force-generating mechanism near a top thereof and comprising a bounce plate and feed passage therein; and
   c) a feed dispensing canister assembly comprising
      an open-top feed dispensing canister assembly shell configured to contain feed,
      a pusher plate located with the feed dispensing canister assembly shell and coupled to a rotating screw, extending the height of the feed dispensing canister assembly shell, that vertically drives said pusher plate vertically upward within said feed dispensing canister assembly shell,
      wherein said feed dispensing canister assembly shell is located within and detachably coupled to said outer shell assembly so that vertical upward movement of said pusher plate caused by said rotational force-generating mechanism rotating said screw causes feed to move vertically upward and out of the open top of the feed dispensing canister assembly shell and to fall between an outside of the feed dispensing canister assembly shell and an inside of the outer shell assembly, onto the bounce plate and through the feed passage.

2. The animal feeder according to claim 1 further comprising a top assembly, which includes the rotational force-generating mechanism and covers the top of the outer shell assembly and the feed dispensing canister assembly therein.

3. The animal feeder according to claim 1 wherein said feed dispensing canister assembly shell is cylindrical.

4. The animal feeder according to claim 1 wherein said bounce plate is formed in at least two parts and is located inside the outer shell assembly, beneath the feed dispensing canister assembly.

5. The animal feeder according to claim 1 further comprising a paddle that broadcasts the feed from the open top of the feed dispensing canister assembly shell over sides of said feed dispensing canister assembly shell, between the outside of the feed dispensing canister assembly shell and the inside of the outer shell assembly, and onto the bounce plate and through the feed passage.

6. The animal feeder according to claim 1 wherein the rotational force-generating mechanism is a member from the group consisting of a motor and a hand crank.

7. The animal feeder according to claim 1 further comprising a feed receptacle assembly attached to an outside portion of the outer shell assembly and elevated slightly above a supporting floor surface, near a bottom of the outer shell assembly, where feed from the feed passage is received.

8. The animal feeder according to claim 1, wherein at least one of the outer shell assembly, the feed dispensing canister assembly, and the bounce plate comprises one or more materials selected from the group consisting of stainless steel, ceramics, carbon fiber composite and plastic.

9. The animal feeder according to claim 1 further comprising an electronic control mechanism operatively associated with the rotational force-generating mechanism for controlling rotation therein.

10. The animal feeder according to claim 9 further comprising an electronic control interface configured to communicate with said electronic control mechanism.

11. The animal feeder according to claim 1 wherein said feed dispensing canister assembly shell includes connectors for detachably coupling said feed dispensing canister assembly shell within and to said outer shell assembly.

12. The animal feeder of claim 11 wherein said connectors carry a pest barrier thereon.

13. The animal feeder of claim 12 wherein said pest barrier carried on the connectors is a pest tape adhered to the connectors for preventing the entry of ants.

14. A method of providing feed to an animal comprising adding said feed to the animal feeder according to claim 1 and directing said animal feeder to dispense said feed.

15. A method of cleaning an animal feeder of claim 1 comprising:

a) removing one of the components from said animal feeder, said component selected from the group consisting of:
   i) said feed dispensing canister assembly shell:
   ii) said bounce plate;
   iii) said feed passage, and
b) cleaning said component; and
c) optionally replacing said component in said animal feeder.

* * * * *